Patented Feb. 4, 1930

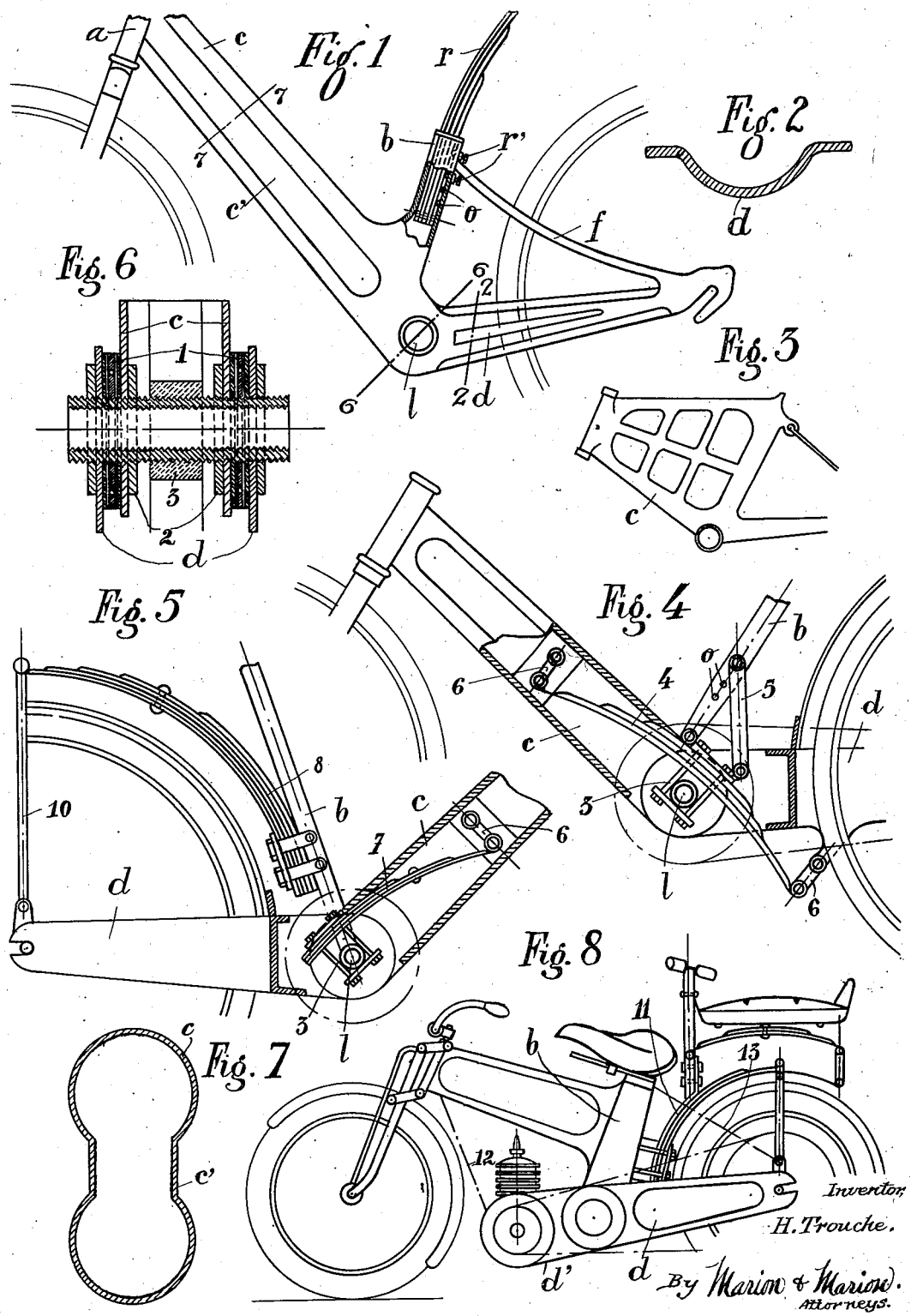

1,745,963

UNITED STATES PATENT OFFICE

HENRI TROUCHE, OF AMBERIEU, FRANCE

BICYCLE AND MOTOR-CYCLE FRAME

Application filed February 5, 1927, Serial No. 166,204, and in France February 8, 1926.

The object of the present invention is to provide a bicycle or motorcycle frame of profiled section of sheet metal having the advantage of being robust and economical in construction, and also ensuring rigid or adjustable elastic suspension of the saddle of the bicycle or motorcycle.

The frame is constituted essentially by a length of sheet metal suitably cut and rolled into 8-form, to which are soldered, or otherwise fixed, the steering tube and the pedal mechanism tube, the back fork, and also an inclined casing enclosing a supporting spring for the saddle, the elasticity of the spring being regulatable at will.

The annexed drawing shows, by way of example, practical constructions of the invention.

Fig. 1 is an elevation of a bicycle frame of profiled section;

Fig. 2 shows the section of the back fork on line 2—2 of Fig. 1;

Fig. 3 shows a different form of frame;

Fig. 4 is a longitudinal section of the frame of a cycle with a single-spring suspension;

Fig. 5 is the same view of a frame in which the suspension is carired out by two half-springs;

Fig. 6 is a sectional view showing the articulation of the frame on the pedal mechanism and taken on line 6—6 of Fig. 1;

Fig. 7 is a section on the line 7—7 in Fig. 1;

Fig. 8 is a view of the whole of a motor cycle having an internal tank and elastic suspension for the frame.

The frame represented in Fig. 1 consists of a strut $c$ formed of a length of sheet metal which is previously cut and suitably rolled into profiled section, the two rounded parts thereof being connected by a central rib $c^1$ Fig. 7. The strut $c$ which may be of any required dimensions is enlarged at its bottom part to receive the pedal mechanism tube as well as the back fork $d$, a section of which is shown in Fig. 2. The strut $c$ is fixed to the steering tube $a$ by soldering or by any other suitable connection, and it is also integral with an inclined casing $b$ in which is arranged a blade spring $r$, fixed by two screws $r^1$ which can be engaged in the spaced holes $o$ formed in the spring $r$.

The frame thus constituted is of very great solidity owing to the section of the strut $c^1$, whose general form may be modified at will. The elasticity of the spring $r$ ensures great suppleness of the suspension without hindering the movements of the cyclist, as the distance of the saddle from the pedals remains appreciably the same.

As shown by the modification in Fig. 3, ribs, designs, hollow, in relief, or even perforated may be arranged in the central part of the frame, which may be very large. The inner part of the frame can also be partitioned. The manufacture of the frame is very economical, because it obviates the employment of costly materials and parts such as tubes, pedal mechanism casing, connections for the steering and saddle tube etc. The number of soldered joints is also diminished and, consequently, also the hand work in assembling. Moreover, the same model of bicycle serves for men or women of any stature, in consequence of the disengaged form at the front of the frame, of the regulation of the position of the spring, said position being adjustable at will by means of the holes $o$.

In the modifications shown in Figs. 4, 5 and 6, the frame is formed by two independent parts $c$ and $d$, mounted on the pedal mechanism tube $l$ and separated by ball-bearing abutments 1 which permit the articulation of the parts between the assembling nuts 2, Fig. 6. The tube $l$ also carries a spring bridle 3 between the nuts 2. In Fig. 4, the bridle is fixed to a single spring 4 which ensures an elastic connection between the two parts $c$ and $d$ of the frame. A rod 5 controls the position of the iron support $b$ of the saddle, the inclination of which can be varied by using one or another of the fixing holes $o$. The two extremities of the spring 4 are fixed by the aid of links 6 respectively to the two independent parts $c$ and $d$ of the frame.

In the type of the frame shown in Fig. 5 the bridle 3 carries a half-spring 7, whose other extremity is connected by a link 6 to the frame $c$, while another half-spring 8, fixed to the iron *b* of the saddle, is held at its other extremity by two rods 10 supported by the back fork *d*.

The frame of the motor cycle shown in Fig. 8 is provided with a single suspension spring 11, ensuring the flexible articulation of the back fork *d* around the pedal mechanism support which is mounted at the lower end of the saddle iron *b*. A member *d¹* extending from the front of the back fork *d*, supports the motor and ensure that it is elastically suspended. In order to make the suspension rigid, it is sufficient to fix the fork *d* and its extension *d¹* by cords 12 and 13 connected to the fixed part of the frame. The springing of the back fork *d* also allows the flexible suspension of a supplementary saddle as shown in Fig. 8.

The elastic frame has the advantage of providing a comfortable suspension, while maintaining the distance between the saddle and pedals invariable, thus always preserving the same riding position.

The arrangement of the suspension members of the frame represented can be modified in any suitable manner, and the profile of the section of the frame can also be varied in any suitable manner.

I claim:

1. A frame of the character described made of sheet metal comprising two profiled sections at its edges, a central rib connecting the profiled section formed by the rolling and folding of the sheet metal, steering means mounting carried by the forward end of the frame, and pedal mechanism casing and back fork carried by the opposite end of said frame.

2. A frame of the character described made of sheet metal comprising two profiled sections at its edges, a central rib connecting the profiled sections formed by the rolling and folding of the sheet metal, steering mechanism mounting carried by the forward end of the frame, pedal mechanism casing and back fork mounted on the opposite end of the frame, and a saddle support receiving casing formed integral with and extending from the intermediate portion of the frame.

3. A frame of the character described made of sheet metal comprising two profiled sections at its edges, a central rib connecting the profiled sections formed by the rolling and folding of the sheet metal, steering mechanism mounting carried by the forward end of the frame, pedal mechanism casing and back fork mounted on the opposite end of the frame, a casing formed integral with and extending upwardly from the intermediate portion of the frame, a spring saddle support adjustably received in said last mentioned casing, and means for fixing the spring support in adjusted position.

4. A frame of the character described made of sheet metal comprising two profiled sections at its edges, a central rib connecting the profiled sections formed by the rolling and folding of the sheet metal, steering means mounting rigidly secured to the forward end of the frame, and a back form yieldably mounted on the opposite end of said frame.

5. A motor cycle frame made of sheet metal comprising two profiled sections at its edges, a central rib connecting the profiled sections formed by the rolling and folding of the sheet metal and a tank received within said frame.

6. A motor cycle frame made of sheet metal comprising two profiled sections at its edges, a central rib connecting the profiled section formed by the rolling and folding of the sheet metal, a tank received within said frame, and a back fork and motor support yieldably connected to one end of said frame.

7. A motor cycle frame made of sheet metal comprising two profiled sections at its edges, a central rib connecting the profiled sections formed by the rolling and folding of the sheet metal, a tank received within said frame, a back fork and engine support member pivoted to one end of the frame, spring means connecting said member to portions of the frame, and a supplementary saddle supported by said spring means.

In witness whereof I have hereunto set my hand.

HENRI TROUCHE.